United States Patent
Foley et al.

(10) Patent No.: US 11,205,522 B2
(45) Date of Patent: *Dec. 21, 2021

(54) APPARATUS AND METHOD TO REMOTELY INSPECT PIPING AND PIPING ATTACHMENT WELDS

(71) Applicant: Westinghouse Electric Company LLC, Cranberry Township, PA (US)

(72) Inventors: Kevin J. Foley, Chattanooga, TN (US); Nathan A. Brown, Chattanooga, TN (US); Charles R. Barrett, Ooltewah, TN (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/780,033

(22) Filed: Feb. 3, 2020

(65) Prior Publication Data
US 2020/0350087 A1 Nov. 5, 2020

Related U.S. Application Data

(62) Division of application No. 14/514,465, filed on Oct. 15, 2014, now Pat. No. 10,593,435.
(Continued)

(51) Int. Cl.
*G21C 17/017* (2006.01)
*G21C 15/25* (2006.01)

(52) U.S. Cl.
CPC .......... *G21C 17/017* (2013.01); *G21C 15/25* (2013.01)

(58) Field of Classification Search
CPC .... G21C 17/017; G21C 17/003; G21C 17/01; G21C 15/25; G01N 29/223; G01N 29/225;
(Continued)

(56) References Cited

U.S. PATENT DOCUMENTS

| 4,569,230 A | 2/1986 | Asty et al. |
| 4,785,819 A | 11/1988 | Pearce |

(Continued)

FOREIGN PATENT DOCUMENTS

| JP | S52143983 U | 10/1977 |
| JP | H0688810 A | 3/1994 |

(Continued)

OTHER PUBLICATIONS

Extended European Search Report for European Patent Application No. 14880971.8.
(Continued)

*Primary Examiner* — Suman K Nath
(74) *Attorney, Agent, or Firm* — K&L Gates LLP

(57) ABSTRACT

An apparatus and method to remotely perform automated piping and piping attachment weld inspections. The apparatus has two spaced positioning arms that rotate out from one side of a frame structure and a kicker arm that rotates out from an opposite side of the frame structure at a location between the two positioning arms. The positioning arms and the kicker arm wedge the frame structure between an object to be scanned and an opposing structure. A scanning subassembly supported on the frame structure is configured to pivot and move in an appropriate direction and to pilot a transducer around the surface of the object to be scanned.

7 Claims, 8 Drawing Sheets

Related U.S. Application Data

(60) Provisional application No. 61/933,952, filed on Jan. 31, 2014.

(58) Field of Classification Search
CPC ......... G01N 29/265; G01N 2291/0289; G01N 29/044; G01N 29/263; G01N 29/2636; G01N 29/2638
See application file for complete search history.

(56) References Cited

U.S. PATENT DOCUMENTS

| | | | |
|---|---|---|---|
| 5,007,291 A * | 4/1991 | Walters | G01N 29/043 |
| | | | 226/176 |
| 5,710,378 A | 1/1998 | Dykes et al. | |
| 5,982,839 A | 11/1999 | Hatley | |
| 6,169,776 B1 | 1/2001 | Collins | |
| 6,222,897 B1 | 4/2001 | Hatley | |
| 6,526,114 B2 | 2/2003 | Paillaman et al. | |
| 6,536,283 B1 | 3/2003 | Hatley | |
| 6,857,814 B2 | 2/2005 | Jensen | |
| 7,587,942 B2 | 9/2009 | Smith et al. | |
| 7,596,200 B2 | 9/2009 | Jensen | |
| 8,548,114 B2 | 10/2013 | Jensen | |
| 10,593,435 B2 | 3/2020 | Foley et al. | |
| 2008/0087113 A1 | 4/2008 | Bagley et al. | |
| 2010/0150296 A1 | 6/2010 | Togasawa | |
| 2012/0099692 A1* | 4/2012 | Foley | G21C 17/003 |
| | | | 376/260 |
| 2012/0140865 A1 | 6/2012 | Vigliano | |
| 2014/0098922 A1 | 4/2014 | Foley | |
| 2015/0200025 A1 | 7/2015 | Hastings | |
| 2015/0221401 A1 | 8/2015 | Foley et al. | |

FOREIGN PATENT DOCUMENTS

| | | |
|---|---|---|
| JP | H07209261 A | 8/1995 |
| JP | 2001116878 A | 4/2001 |
| JP | 2007132667 A | 5/2007 |
| WO | 2015116262 A1 | 8/2015 |

OTHER PUBLICATIONS

International Search and Written Opinion for International PCT Application No. PCT/US2014/062788, dated Jan. 27, 2015.

* cited by examiner

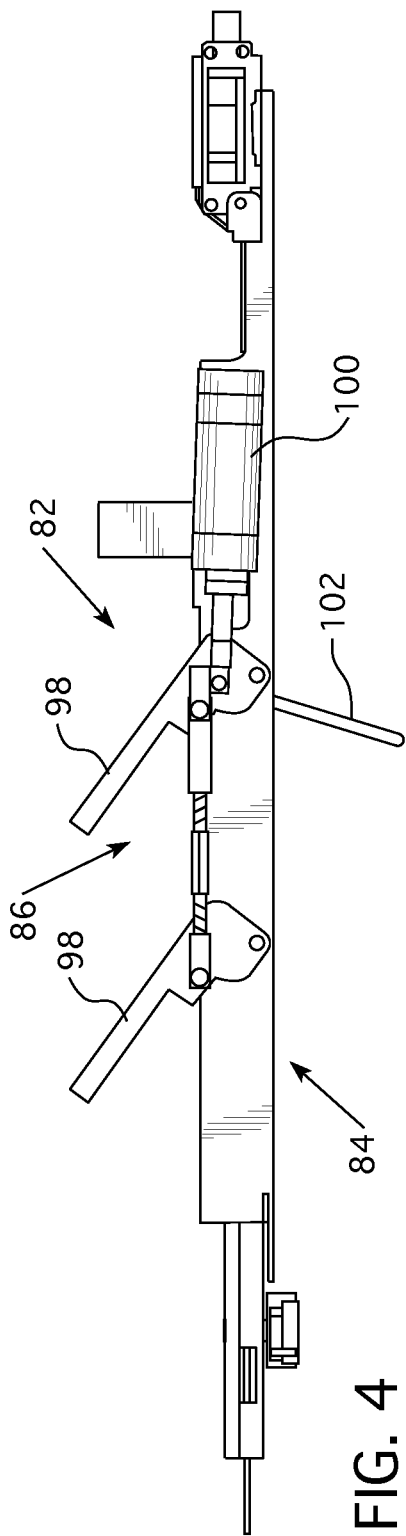
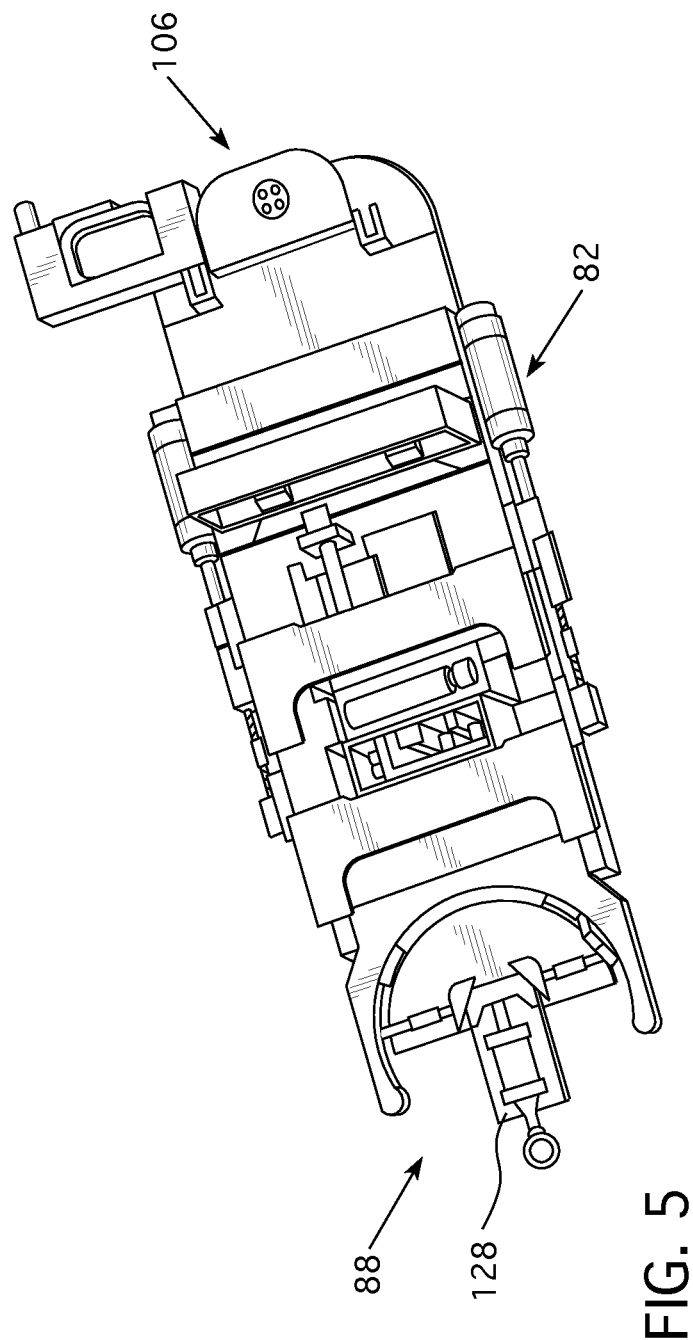
FIG. 4
FIG. 5

APPARATUS AND METHOD TO REMOTELY INSPECT PIPING AND PIPING ATTACHMENT WELDS

CROSS REFERENCE TO RELATED APPLICATION

This application is a divisional application claiming priority under 35 U.S.C. § 121 to U.S. patent application Ser. No. 14/514,465, entitled Apparatus And Method To Remotely Inspect Piping And Piping Attachment Welds, filed Oct. 15, 2014, which issued as U.S. patent Ser. No. 10,593,435 on Mar. 17, 2020, which claims priority to U.S. Provisional Application Ser. No. 61/933,952, filed Jan. 31, 2014, entitled "Apparatus And Method To Remotely Inspect Piping And Piping Attachment Welds."

BACKGROUND

1. Field

This invention pertains generally to nondestructive inspection tools and methods and more particularly to such tools and methods that can be employed for inspecting difficult to access locations such as around the welds on jet pumps of boiling water reactors.

2. Related Art

A nuclear reactor produces electrical power by heating water in a reactor pressure vessel that contains a nuclear core of fissile material in order to generate steam which is used in turn to drive a steam turbine. A reactor pressure vessel of a boiling water reactor typically has a generally cylindrical shape and is closed at both ends, e.g., by a bottom head and a removable top head. A top guide typically is spaced above a core plate within the reactor pressure vessel. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a boiling water reactor, hollow tubular jet pumps, positioned within the shroud annulus, provide the required reactor core water flow. The upper portion of the jet pumps, known as the inlet mixer, is laterally positioned and supported against two opposing rigid contacts within restrainer brackets by a gravity actuated wedge. The restrainer brackets support the inlet mixer by attaching to the adjacent jet pump riser pipe. The lower portion of the jet pump, known as the diffuser, is coupled to the inlet mixer by a slip joint. The slip joint between the jet pump inlet mixer and the jet pump diffuser collar has about 0.015 inch diametrical operating clearance which accommodates the relative axial thermal expansion movement between the upper and lower parts of the jet pump and permits leakage flow from the driving pressure inside the pump.

The inlet mixer and the diffuser, due to their large size, are formed by welding a plurality of cylindrical sections together. Specifically, the respective ends of adjacent cylindrical sections are joined with a circumferential weld. During operation of the reactor, the circumferential weld joints may experience intergranular stress corrosion cracking and irradiation assisted stress corrosion cracking in the weld heat affected zones which can diminish the structural integrity of the jet pump. Various other components and structures in the nuclear reactor have experienced similar defects because of the harsh environment. Accordingly, it is important to examine periodically these components to assess their structural integrity and determine the need for repair. Ultrasonic inspection is a known technique for detecting cracks in nuclear reactor components. Many of the areas in a nuclear reactor that need to be inspected may have limited access and therefore, are difficult to assess using an inspection tool. For example, the jet pump riser pipe and elbow welds are periodically examined for cracking. The presence of cracking can diminish the structural integrity of a jet pump riser pipe and elbow and in extreme cases adversely impact reactor coolant flow. However, the jet pump riser pipe and elbow are difficult to access. Installation access is limited to the annular space between the outside of the shroud and the inside of the reactor pressure vessel, between adjacent jet pumps. Scanning operation access is additionally restricted within the narrow space between the jet pump riser pipe and vessel, shroud, or other welded attachments such as the riser brace or restrainer brackets.

Furthermore, the inspection areas in a nuclear reactor can be highly radioactive and can pose safety risks for personnel working in these areas. Thus, inspection of these areas for the most part can require a robotic device which can be installed remotely and operated within the narrowly restricted space.

Inspecting and repairing nuclear reactors, such as boiling water reactors, typically involves manually controlled poles and ropes to manipulate servicing devices and/or positioning of these devices. During reactor shutdown, servicing of some components requires installation of inspection manipulators or devices 30 to 100 feet deep within the reactor coolant. Relatively long durations are required to install or remove manipulators and can impact the plant shutdown duration. In addition, different inspection scopes can require several different manipulators or reconfigurations requiring additional manipulator installations and removals and costs. The long durations cannot only impact plant shutdown durations, but also increase personnel radiation and contamination exposure.

Plant utilities have a desire to reduce the number of manipulator installations and removals to reduce radiological exposure as well as costs and plant outage impact. In addition, the plant utilities have a desire to reduce costs and operate as productively as possible.

Thus, it is an object of this invention to minimize the number of reconfigurations and the number of tools required to perform inspections. In addition, it is a further object of this invention to provide a means to inspect difficult to access components such as jet pump riser piping areas that have previously been inaccessible with existing tooling.

SUMMARY

These and other objects are achieved by an automated inspection assembly that includes a number of subassemblies. One of the subassemblies comprises a frame subassembly having a first side and a second side and a length and width with the width substantially larger than a thickness of the frame subassembly between the first side and the second side. The length has a first end and a second end along a longitudinal dimension and the frame assembly is configured to form the main support structure for the automated inspection apparatus. A second subassembly is the positioning arm subassembly which is coupled to the frame subassembly and includes a support arm remotely operable to extend out from and retract toward the first side. A kicker arm is remotely operable to extend out from or retract toward the second side. The support arm and the kicker arm in the extended position are operable to wedge the frame subassembly between a member to be inspected and a surface opposed to the member to be inspected. A scanning subassembly is also supported from the frame subassembly and is configured to scan at least a portion of the member to conduct the desired nondestructive examination.

In one embodiment, the automated inspection assembly further includes an orientation pivot subassembly that includes a rotational pivot joint coupling. The orientation pivot subassembly is connected to the first end of the frame subassembly. The orientation pivot subassembly is configured, through the rotational pivot joint coupling to orient the frame subassembly in one of two vertical positions with either the first end up or the second end up.

In still another embodiment, the automated inspection assembly includes a lead in/gripper subassembly attached to the second end of the frame subassembly and configured to position the automated inspection assembly at the location to be inspected. Desirably, a scanning subassembly is supported from the second end of the frame subassembly and includes a substantially horseshoe-shaped scan head sized to receive the member to be scanned, a scan head wrist coupling joint, a linear hanger coupling joint and a linear drive box operable to move one or more transducers along the member to be inspected in a vertical, horizontal, radial, and a circumferential direction relative to the member, with the frame assembly in-line with the member.

In still another embodiment, the support arm is formed in the general shape of a fork. When the member to be inspected is a pipe or a pipe elbow, preferably the support arm has a generally "U" shaped outer end configured to accept the pipe or pipe elbow within the opening of the "U". Desirably, the support arm is configured to rotate out from the frame subassembly. Similarly, it is preferable that the kicker arm is configured to rotate out from the frame assembly. In one such embodiment, the support arm is operated to move hydraulically while the kicker arm is operated to move pneumatically. In such an arrangement, the support arm may comprise two support limbs spaced along the longitudinal dimension of the frame assembly with each of the limbs being operable to extend out from or retract towards the first side of the frame subassembly. Desirably, in such an arrangement, the outward ends of the kicker arm is positioned along the second side of the frame subassembly so as to engage the opposed surface at an elevation in between a first and second elevation on the member to be inspected that the two limbs respectively contact.

Preferably, the scanning assembly houses at least one inspection device selected from a group of sensors comprising an ultrasonic transducer, eddy current transducer and video image capture device. The automated inspection assembly also preferably includes a mounting cup configured to remotely couple to the frame subassembly to vertically and horizontally position the automated inspection assembly relative to the member to be inspected.

This invention also contemplates a method of inspecting a pipe comprising the steps of transporting a scanning assembly to the pipe; remotely wedging the scanning assembly between the pipe and an opposing surface to support the scanning assembly in a desired position; and scanning a surface of the pipe. The method may also include the steps of: positioning the scanning assembly at a desired location along the pipe; and extending opposing arms from opposite sides of the frame subassembly of the scanning assembly to contact both the pipe and the opposing surface.

BRIEF DESCRIPTION OF THE DRAWINGS

A further understanding of the invention claimed hereafter can be gained from the following description of the preferred embodiments when read in conjunction with the accompanying drawings in which:

FIG. 4 is a side view of the embodiment of the manipulator shown in FIG. 3;

FIG. 5 is a perspective view of the embodiment of the manipulator shown in FIG. 3 with the orientation pivot subassembly rotated in the opposite direction and a gripper installed;

DESCRIPTION OF THE PREFERRED EMBODIMENT

Figure 1:
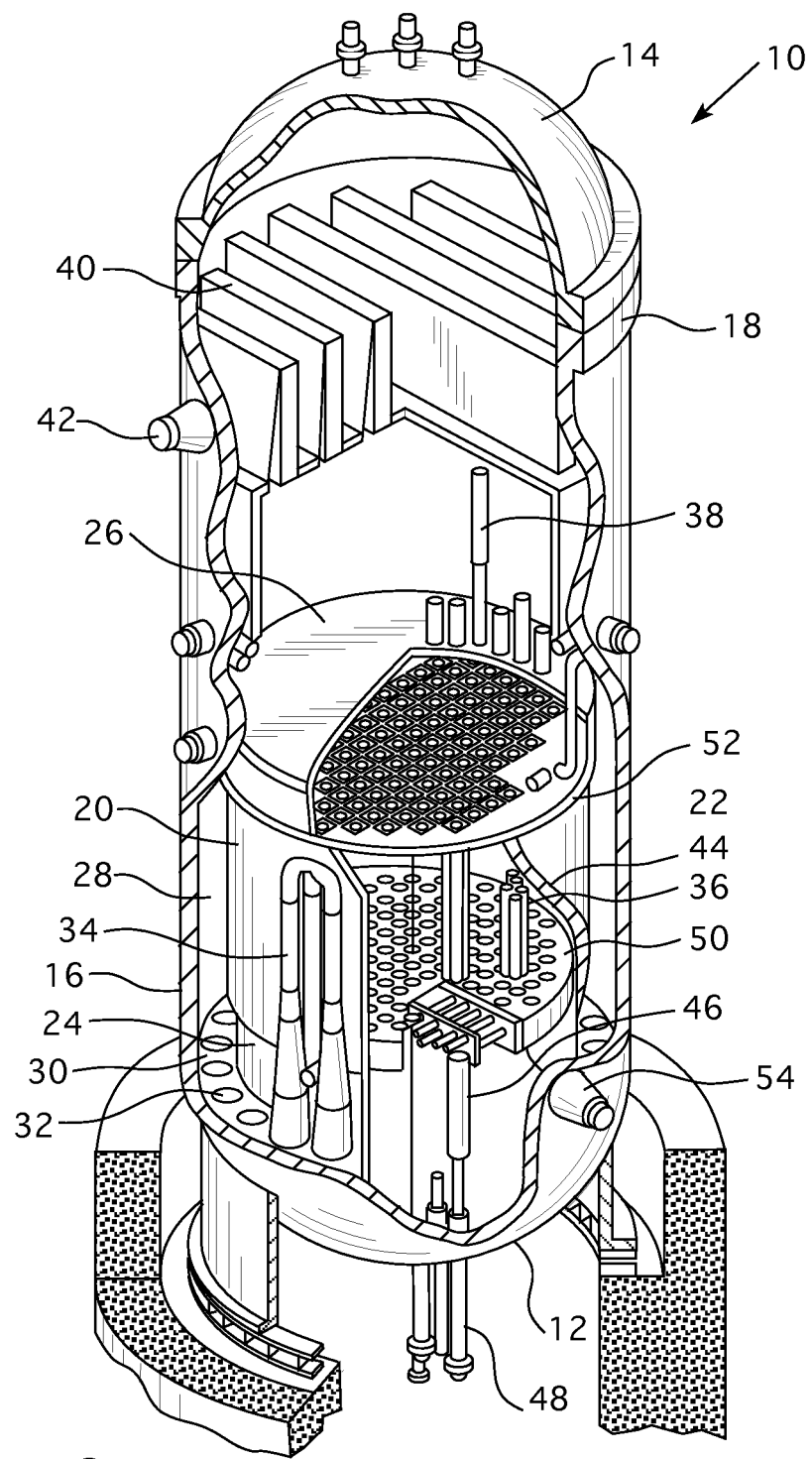
FIG. 1 is a sectional view, with parts cut away, of a boiling water nuclear reactor pressure vessel.

FIG. 1 is a sectional view, with parts cut away, of a boiling water nuclear reactor pressure vessel 10. The reactor pressure vessel 10 has a generally cylindrical shape and is closed at one end by a bottom head 12 and at its other end by a removable top head 14. A sidewall 16 extends from the bottom head 12 to the top head 14. Sidewall 16 includes a flange 18 upon which the top head 14 is sealed. A cylindrical-shaped core shroud 20 within the pressure vessel 10 surrounds a reactor core 22. Shroud 20 is supported at one end by a shroud support 24 and includes a removable shroud head 26 at the other end. An annulus 28 is formed between the shroud 20 and the sidewall 16. A pump deck 30, which has a ring shape, extends between the shroud support 24 and the reactor pressure vessel sidewall 16. The pump deck 30 includes a plurality of circular openings 32, with each opening housing a jet pump assembly 34. Jet pump assemblies 34 are circumferentially distributed around the core shroud 20.

Heat is generated within the core 22 from fuel bundles 36 of fissionable material. Water circulated up through the core 22 is at least partially converted to steam. Steam separators 38 separate steam from water, which is recirculated. Residual water is removed from the steam by the steam dryers 40. The steam exits the reactor vessel 10 through a steam output nozzle 42 near the vessel top head 14.

The amount of heat generated within the core 22 is regulated by inserting and withdrawing control rods 44 of neutron absorbing material, such as for example, hafnium. To the extent that the control rods 44 are inserted into the fuel bundles 36, they absorb neutrons that would otherwise be available to promote the fission chain reaction which generates the heat in the core 22. Control rod guide tubes 46 direct the vertical motion of the control rods 44 during insertion and withdrawal. Control rod drives 48 effect the insertion and withdrawal of the control rods 44. The control rod drives 48 extend through the bottom head 12.

The fuel bundles 36 are aligned by a core plate 50 located at the base of the core 22. A top guide 52 aligns the fuel bundles 36 as they are lowered into the core 22. Core plate 50 and top guide 52 are supported by the core shroud 20.

Figure 2:
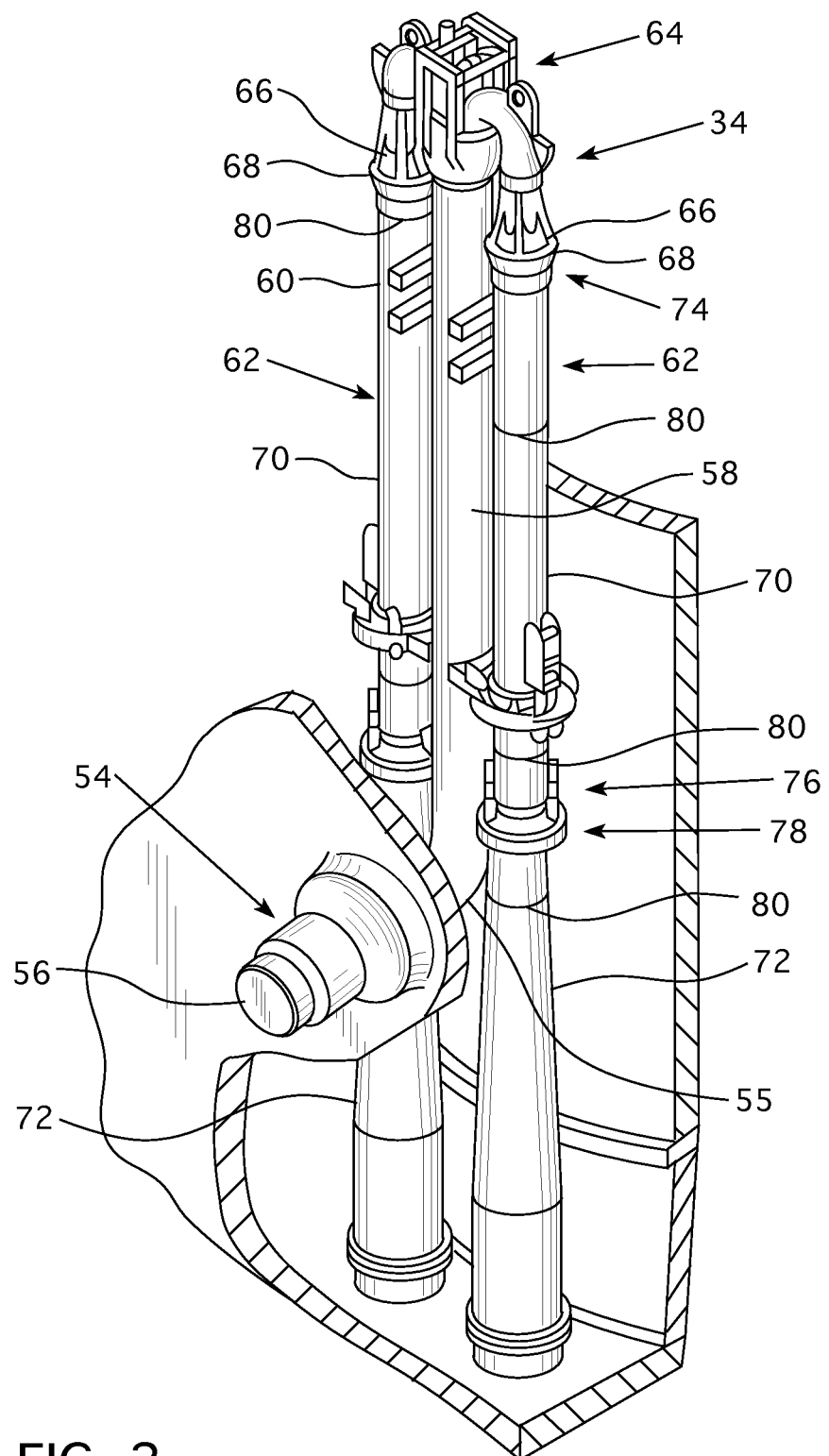
FIG. 2 is a perspective view of a portion of the pressure vessel and shroud with parts cut away to show some of the detail of a jet pump assembly shown in FIG. 1.

FIG. 2 is a perspective view of a portion of the reactor vessel and shroud, with parts cut away to show some of the details of a jet pump assembly 34. An inlet nozzle 54 extends through the sidewall 16 of the reactor pressure vessel 10 and is coupled to a jet pump assembly 34. Jet pump assembly 34 includes a thermal sleeve 56 that extends through the inlet nozzle 54, a lower elbow 55 (only partially visible in FIG. 2), and a riser pipe 58. The riser pipe 58 extends between and substantially parallel to the shroud 20 and reactor pressure vessel sidewall 16. Riser braces 60 stabilize riser pipe 58 within the reactor pressure vessel 10.

Riser pipe 58 is coupled to jet pumps 62 by a transition assembly 64. Each jet pump 62 includes a jet pump nozzle 66, a suction inlet 68, and inlet mixer 70, and a diffuser 72. Jet pump nozzle 66 is positioned in the suction inlet 68 which is located at a first end 74 of the inlet mixer 70. Diffuser 72 is coupled to a second end 76 of the inlet mixer 72 by a slip joint 78. Because of their large size, both inlet mixer 70 and diffuser 72 are formed from multiple cylindrical sections. Circumferential weld joints 80 join the cylindrical sections together.

Figure 3:
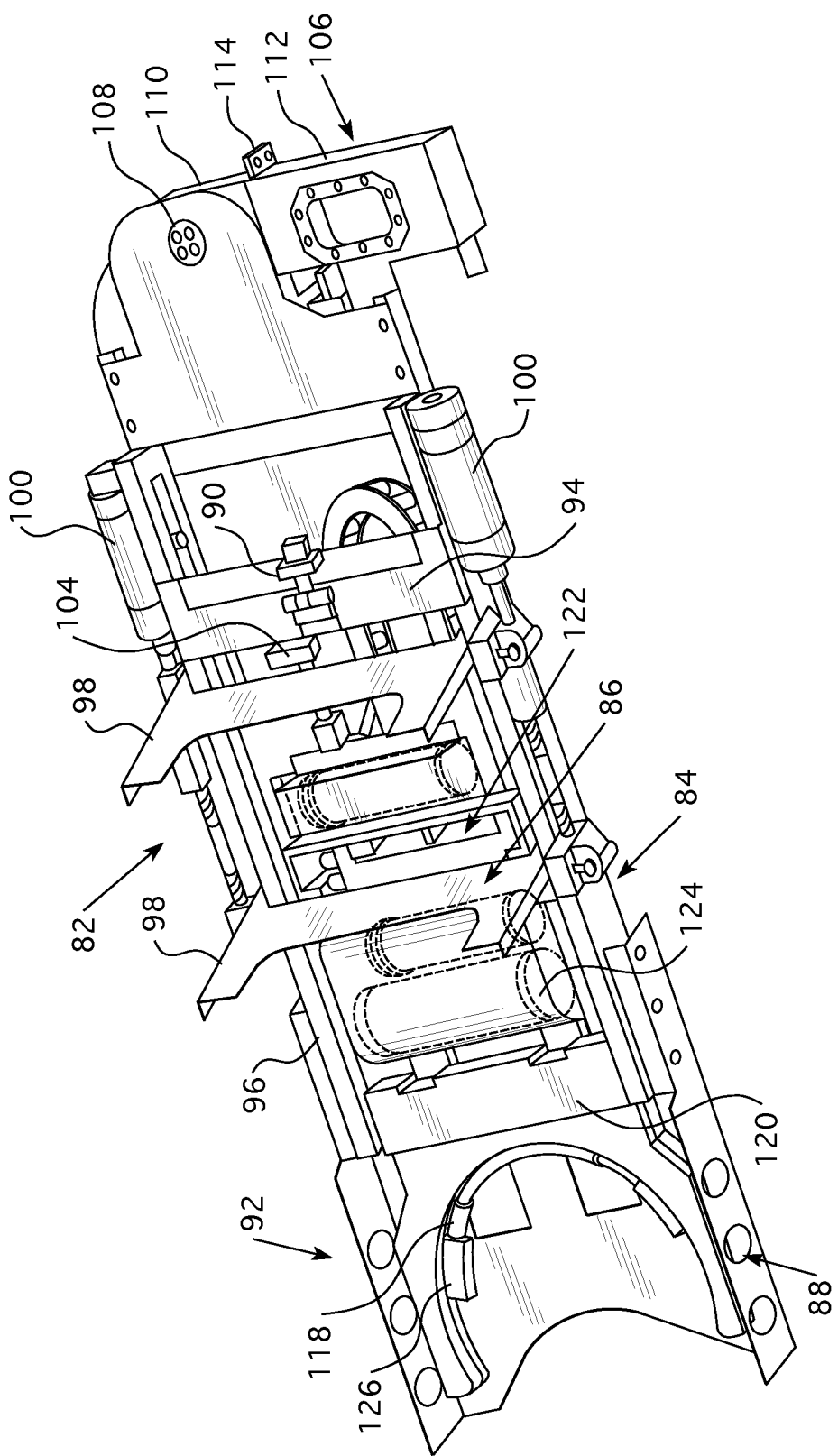
FIG. 3 is a perspective view of one embodiment of a manipulator within the purview of the claims set forth hereafter, which is particularly suited for inspecting the welds in hard to reach areas of the jet pump shown in FIG. 2.

FIG. 3 is a perspective view of one embodiment of an automated inspection assembly 82 within the purview of the claims set forth hereafter, that can be employed to access difficult to reach areas around the circumferential welds of the jet pump assembly, especially in areas between the jet pump assembly and the shroud. The embodiments of the automated inspection assembly 82 illustrated in FIG. 3-5 have a number of subassemblies including a frame subassembly 84, a positioning arm subassembly 86 (also referred to as the support arm assembly), a lead in or gripper subassembly 88, a mounting cup subassembly 90 and a scanning subassembly 92. The frame subassembly 84 serves as the main support structure for the apparatus and includes mounting features 94 and guide rails 96 for mounting and securing all the other subassemblies.

The positioning arms subassembly 86 includes at least two spaced hydraulically actuated fork arms 98 each having a generally "U" shape with an opening between the tines of the fork large enough to at least partially fit around the pipe or elbow to be scanned. The dual forks 98 are actuated by the hydraulic cylinder 100 and can be detached from the rails 96 and replaced with forks with shorter or longer tines to accommodate different applications. The fork arms 98 (i.e., positioning arms) can rotate from a flat position substantially against the frame assembly 84 to at least an approximately vertical position. This can be seen from the side view in FIG. 4. A kicker arm 102 that extends from the opposite side of the frame subassembly 84 and is operated by a pneumatic cylinder 104 to rotate from a substantially flat position parallel to the frame subassembly 84 to a substantially vertical position as shown in the side view in FIG. 4, and works with the positioning arms 98 to support the inspection assembly 82. The kicker arm 102 may be part of the frame subassembly 84 or it may be part of the positioning arms subassembly and is preferably located in between the fork arms along the elongated dimension of the frame subassembly. The coordinated motions of the positioning arms subassembly 86 utilized for the forks 98 and the kicker arm 102 allows precise positioning of the apparatus frame subassembly 84 relative to the examination pipe, e.g., the riser 58. The pneumatic drive 104 for the kicker arm 102 provides a much softer operating force on the kicker arm that is spring like as compared to the more rigid hydraulic force 100 to the fork arms 98 which maintains the scanning head when fully deployed at a fixed distance from the member to be inspected, while the spring like movement of the kicker arm assures the automated inspection assembly remains wedged in position.

The orientation pivot subassembly 106 includes a rotational pivot joint 108 attaching the orientation pivot subassembly to the frame subassembly 84. The swivel adaptor arm 110 with the junction box 112 is constrained with a quick release pin coupling 114 to change configurations (as shown in FIGS. 3 and 5). The arm 110 is symmetric for simple reconfiguration from a clockwise installation to a counter clockwise installation. This pivoting motion provides a means to orient the tool in an upright or upside down orientation to accommodate different examinations.

The lead in or gripper subassembly 88 attaches to the frame subassembly 84, extends out under the scanning subassembly and serves the purpose of vertically positioning the apparatus by either resting on a pipe elbow, or gripping a pipe attachment. The lead in/side rails 130 attach to the frame and lead the tool onto the pipe elbow and support the weight of the tool. The lead in/side rails can be replaced with the gripper 128 which can be used to hang the automated inspection assembly 82 from the riser brace. A mounting cup assembly 116 shown in FIG. 8 can be remotely coupled to the frame subassembly 84 and is utilized to vertically position the inspection assembly 82 relative to the pipe end or transition piece of the pipe.

The scanning subassembly 92 includes a horseshoe-shaped scan head 118 sized to receive the pipe, a scan head wrist coupling joint 120, a linear hanger coupling joint 122 and a linear drive box 124. The scan head 118 houses movably coupled transducers 126 and provides a means for moving these transducers along the pipe welds to perform inspections. The scanning subassembly 92 coupled to the frame subassembly 84 provides a means to move the transducers along the pipe in a vertical, horizontal, radial, and circumferential direction relative to the pipe or pipe elbow with the longitudinal direction of the frame oriented in-line with the pipe. The scan head wrist coupling joint 120 is hung from the X-axis and the scan head wrist coupling joint, linear hanger coupling joint 122 and linear drive box 124 enables 90 degree rotation and approximately 9.5 inch stroke in the Y direction (the direction of the longitudinal dimension of the frame assembly) and 1.25 inch stroke in the X direction (perpendicular to the flat surface of the frame assembly), which makes the automated inspection assembly very versatile.

Figure 9:
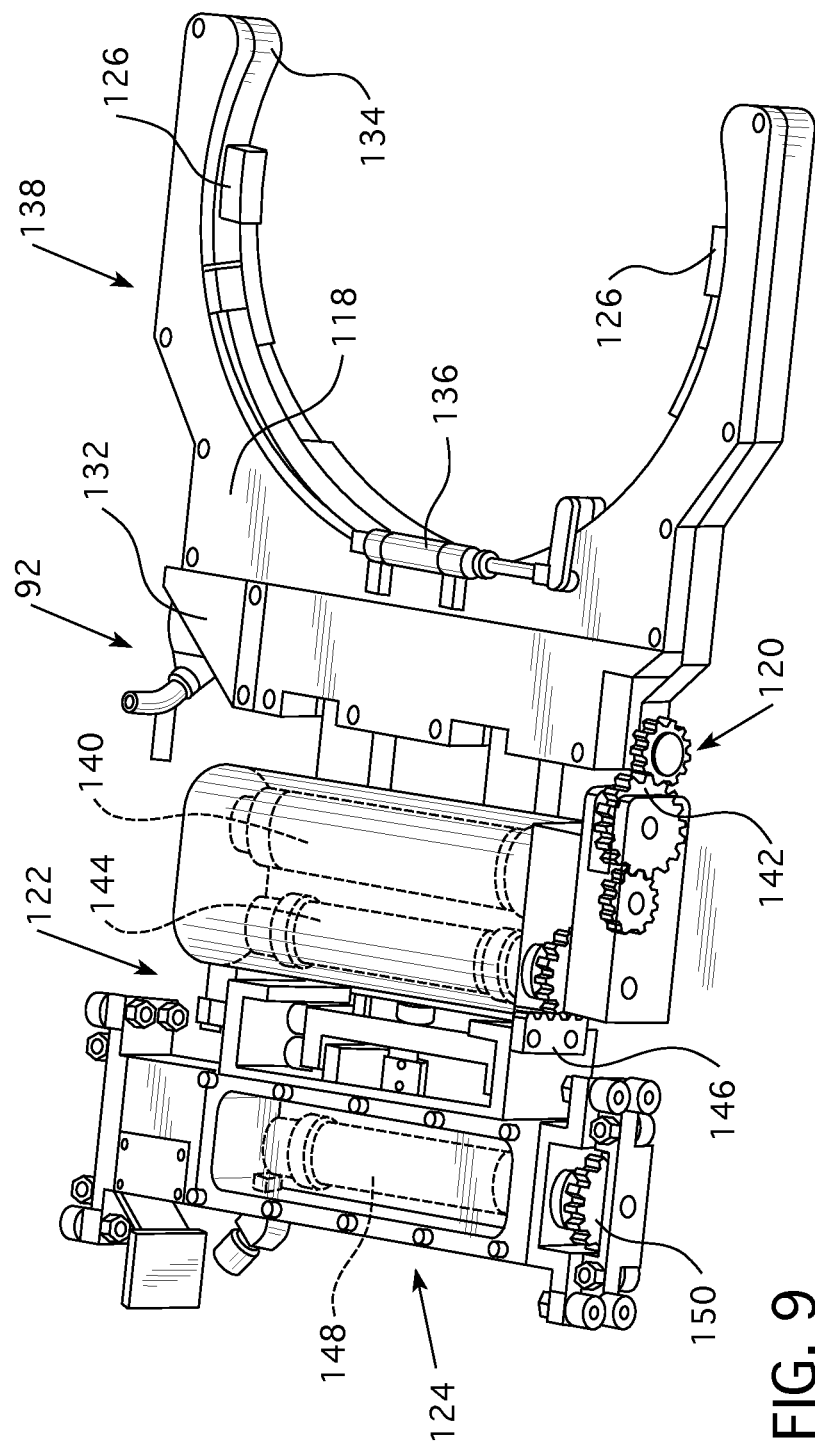
FIG. 9 is an enlarged, top perspective view of the scanning subassembly showing the drive box.
Figure 10:
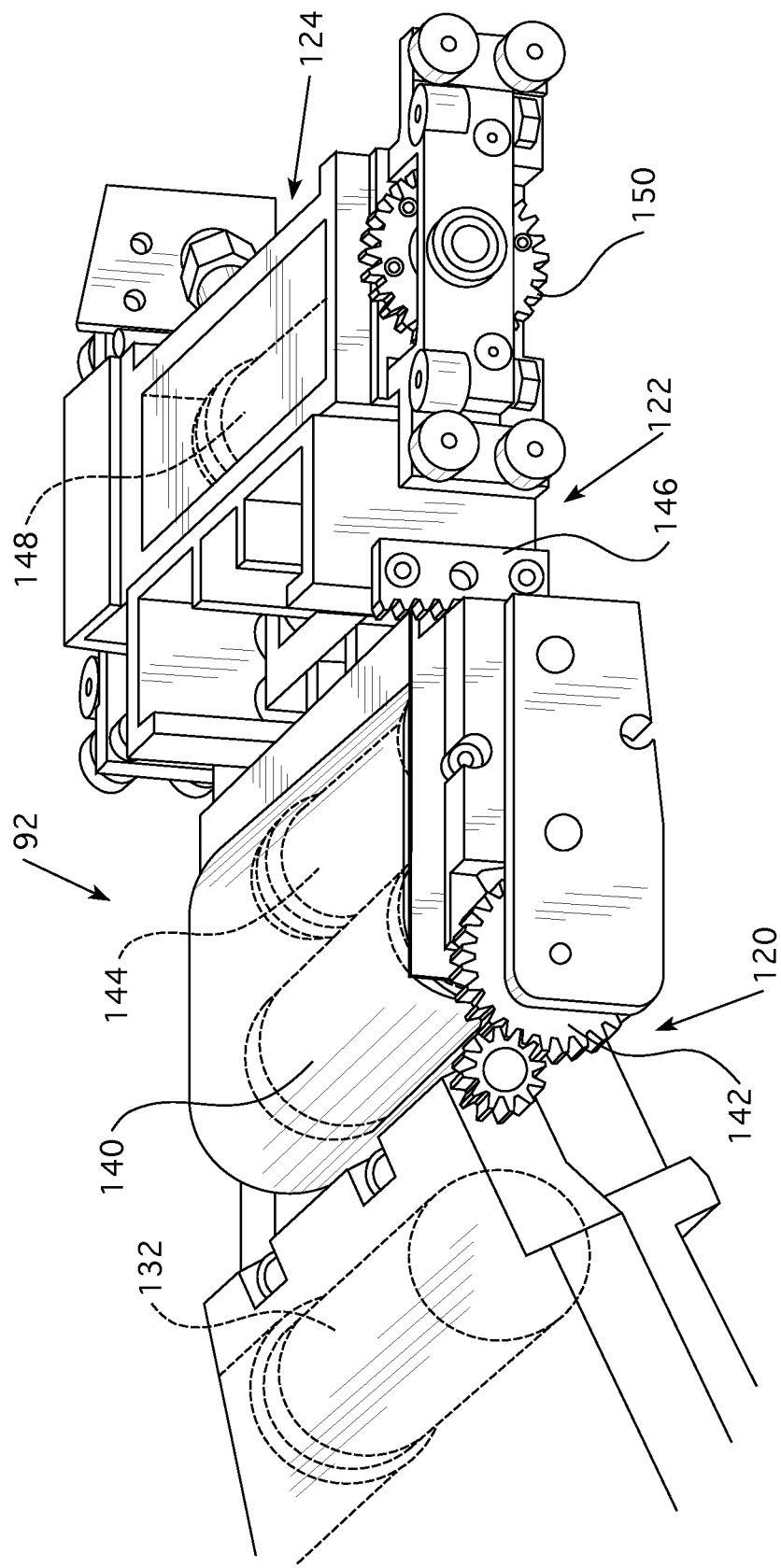
FIG. 10 is an enlarged, bottom perspective view of the drive box shown in FIG. 9.

A more detailed understanding of the drive system of the scanning subassembly can be had by reference to the enlarged views shown in FIGS. 9 and 10. The motor 132 drives the sensors 126 around the track 134 on the inside surface of the generally "U" shaped scanning head 138 and the pneumatic cylinder 136 moves the sensors 126 radially so the sensors can come in close contact with the surface of the member to be inspected, where close contact is required. The motor 140 provides the wrist motion through the gear assembly 142 that enables the 90 degree rotation of the scanning head 138. The motor 144 through the gear assembly 146 and the linear hanger coupling joint 122 provides the 1.25 inch stoke in the X direction. Movement in the Y direction is achieved through the motor 148 and drive gear 150 which rides on a toothed track on the frame subassembly 84. The frame subassembly 84 coupled to the positioning arms subassembly 86, provides a means to position the frame within a variable annular gap between a pipe and a wall, e.g., the shroud, or pressure vessel, so the scanning subassembly drive system can finely position the scanning head 138 around the pipe or elbow and the sensors 126 over the portion of the member to be scanned. This unique design provides a means to perform remotely controlled automated piping inspections in limited access areas on a variety of welds and plant conditions.

Figure 6:
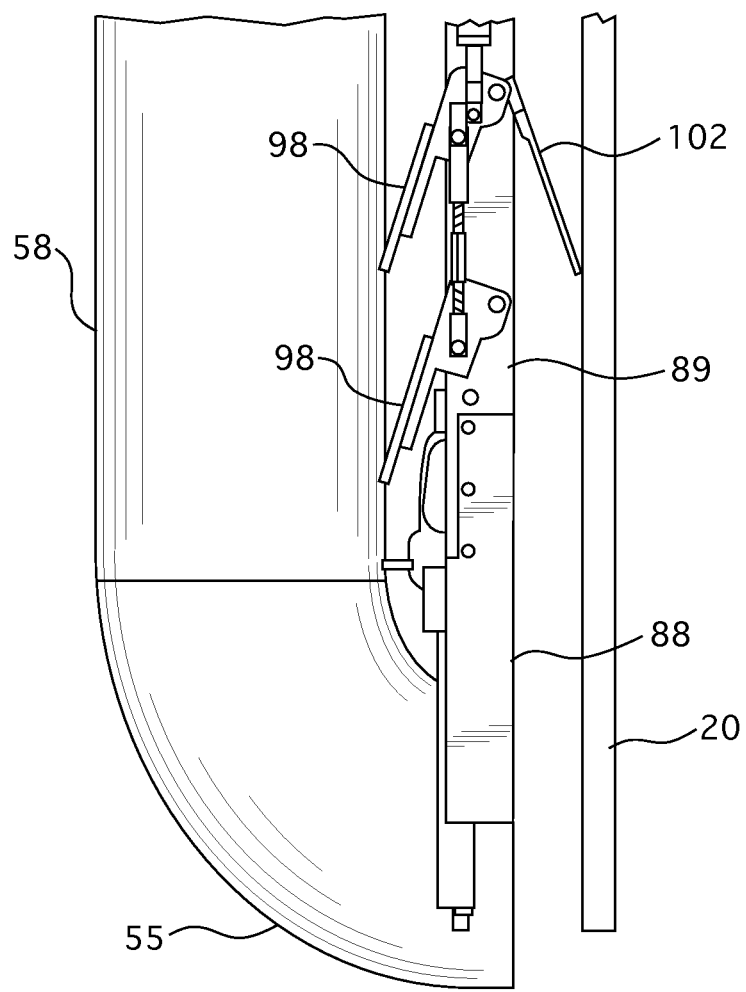
FIG. 6 is a side view of the manipulator shown in FIG. 3 positioned over an elbow on a jet pump riser, wedged between the riser and the reactor vessel.
Figure 7:
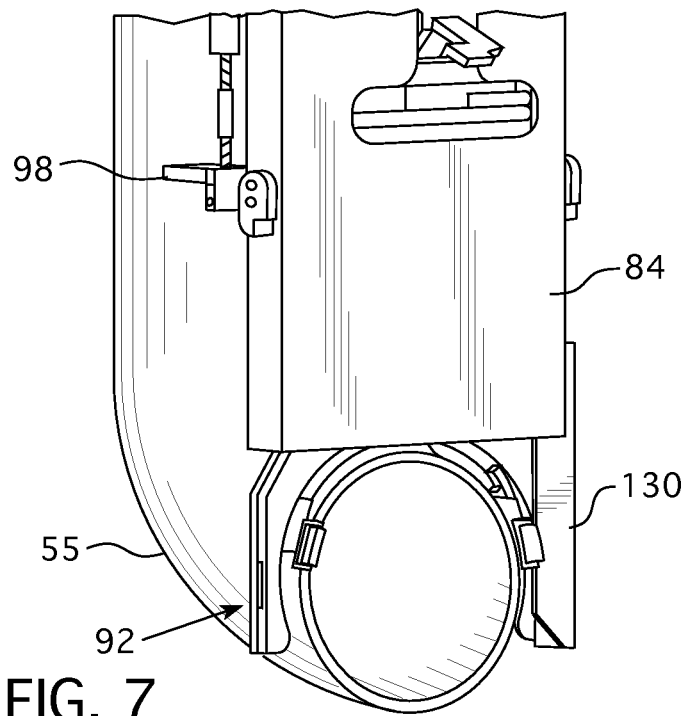
FIG. 7 is a rear view of a portion of the manipulator shown in FIG. 6 with the lead in subassembly resting over a cross section of the riser elbow, revealing the scanning subassembly of the manipulator.
Figure 8:
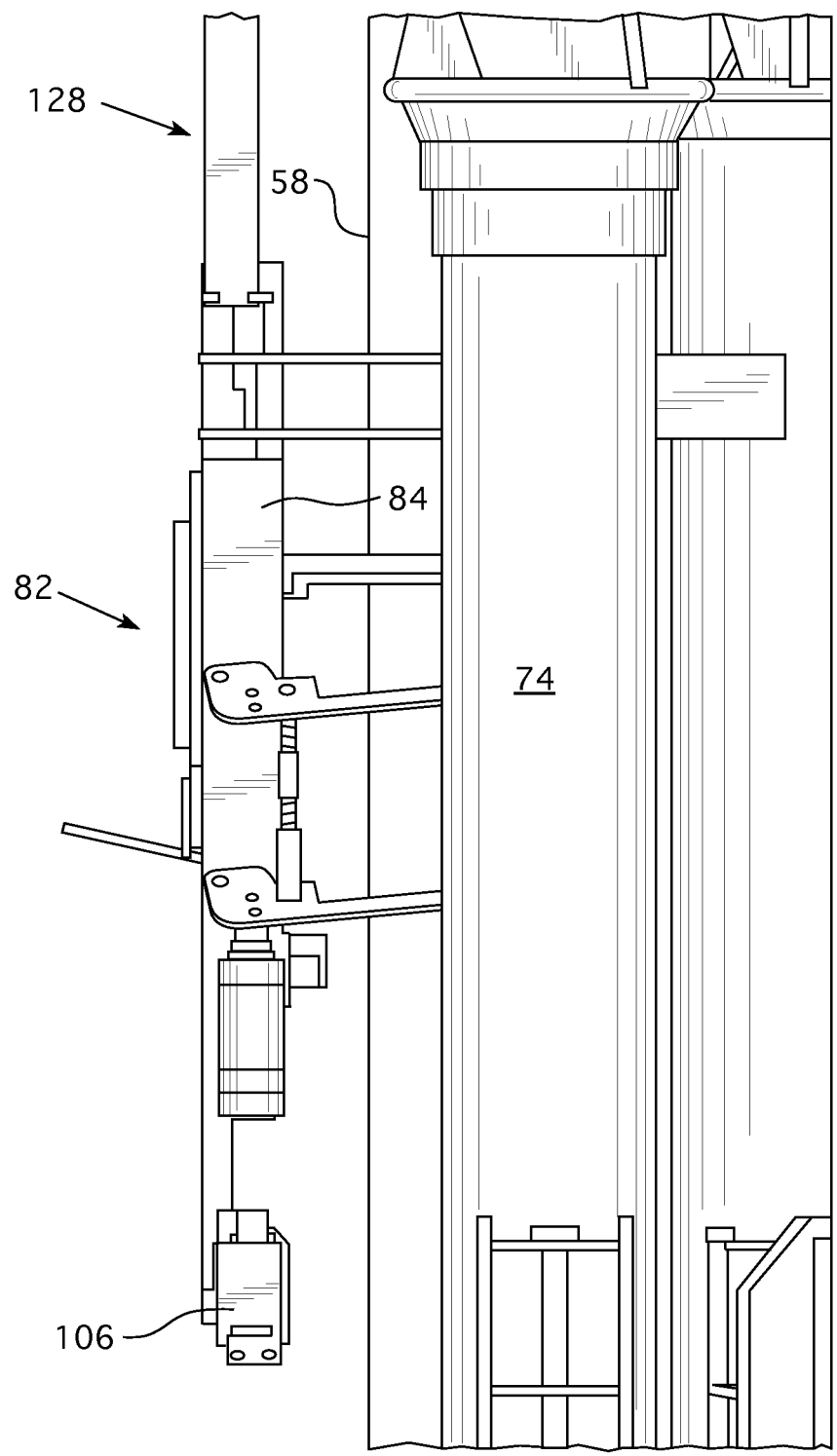
FIG. 8 is a side view of the manipulator shown in FIG. 3 with the scan head subassembly rotated 90 degrees and positioned around the member to be inspected while the manipulator is wedged between the member and the shroud.

FIG. 5 shows the automated inspection assembly illustrated in FIG. 4 with the orientation pivot subassembly 106 pivoted in the opposite direction and a gripper assembly 128 in place of the lead in side rails on subassembly 88. The gripper assembly can be employed to attach to various features of the pipe attachment components to further support the inspection assembly 82. A side rail 130 can also be used to protect the scan head 118 and probes 126. FIG. 6 shows the lead in subassembly 88 positioned over an elbow 55 with the fork arms 98 pressured against the riser pipe 58 and the kicker arm 102 pressured against the vessel wall 16 to wedge the frame assembly 84 in a scanning position between the vessel wall and the riser pipe 58. FIG. 7 shows a front view of the cross section of the elbow shown in FIG. 6 showing a better view of the side rail 130 and scanning subassembly 92. FIG. 8 shows the inspection subassembly 82 wedged between the vessel wall 16 (not shown) and the inlet mixer 74 where the inspection subassembly can be lowered to inspect the circumferential welds 80 by rotating the scanning subassembly head down 90 degrees to extend around a portion of the surface of the weld to be scanned while the frame subassembly 84 is in-line with the inlet mixer 74.

The invention also contemplates a method of inspecting a pipe employing the foregoing apparatus, comprising the steps of: transporting a scanning assembly to the pipe; remotely wedging the scanning assembly between the pipe and an opposing surface to support the scanning assembly in a desired position; and scanning a surface of the pipe. The method may also include the steps of positioning the scanning assembly at the desired location along the pipe and extending opposing arms from opposite sides of the frame subassembly of the scanning assembly to contact both the pipe and the opposing surface.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A method of inspecting a pipe comprising the steps of:
transporting a scanning assembly to the pipe;
remotely wedging the scanning assembly between the pipe and an opposing surface to support the scanning assembly in a desired position;
supporting the entire weight of the scanning assembly employing at least one hydraulically operated wedge extending from a first side of the scanning assembly and an arm extending from a second side of the scanning assembly; and
scanning a surface of the pipe.

2. The method of claim 1 further comprising the steps of:
positioning the scanning assembly at a desired location along the pipe; and
extending the at least one hydraulically operated wedge and the arm to contact both the pipe and the opposing surface.

3. The method of claim 2 including the steps of:
operating the at least one hydraulically operated wedge hydraulically; and
operating the arm pneumatically.

4. A method of inspecting a pipe, comprising:
transporting a scanning assembly to the pipe;
positioning the scanning assembly between the pipe and an opposing surface;
supporting the entire weight of the scanning assembly employing a hydraulically-operated wedge extending from a first side of the scanning assembly and an arm extending from a second side of the scanning assembly; and
scanning a surface of the pipe.

5. The method of claim 4, further comprising:
hydraulically extending the hydraulically-operated wedge; and
pneumatically extending the arm.

6. The method of claim 5, further comprising:
engaging the pipe with the hydraulically-operated wedge; and
engaging the opposing surface with the arm.

7. The method of claim 5, further comprising:
engaging the opposing surface with the hydraulically-operated wedge; and
engaging the pipe with the arm.

* * * * *